United States Patent
Freienstein et al.

(10) Patent No.: US 10,560,895 B2
(45) Date of Patent: Feb. 11, 2020

(54) METHOD FOR OPERATING A MOBILE DEVICE AND A DATA MANAGEMENT SYSTEM, MOBILE DEVICE, DATA MANAGEMENT SYSTEM

(71) Applicant: Robert Bosch GmbH, Stuttgart (DE)

(72) Inventors: Heiko Freienstein, Weil der Stadt (DE); Benjamin Visel, Bad Liebenzell-Moettlingen (DE); Joerg Moennich, Stuttgart (DE); Anna Heszler, Schwieberdingen (DE); Anja Koenig, Stuttgart (DE); Jan Ondratschek, Remshalden (DE); Christoph Steurer, Urbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/738,971

(22) PCT Filed: May 12, 2016

(86) PCT No.: PCT/EP2016/060640
§ 371 (c)(1),
(2) Date: Apr. 12, 2018

(87) PCT Pub. No.: WO2016/206858
PCT Pub. Date: Dec. 29, 2016

(65) Prior Publication Data
US 2018/0220370 A1    Aug. 2, 2018

(30) Foreign Application Priority Data
Jun. 24, 2015 (DE) .................. 10 2015 211 673

(51) Int. Cl.
*H04W 52/02*    (2009.01)

(52) U.S. Cl.
CPC ..... *H04W 52/0229* (2013.01); *H04W 52/028* (2013.01); *H04W 52/0258* (2013.01); *Y02D 70/142* (2018.01)

(58) Field of Classification Search
CPC ... H04B 1/38; H04B 1/1615; H04W 52/0229; H04W 52/0258; H04W 52/028
See application file for complete search history.

(56) References Cited

U.S. PATENT DOCUMENTS

| | | | |
|---|---|---|---|
| 5,838,720 A * | 11/1998 | Morelli ............... | H04B 1/1615 375/219 |
| 2002/0025839 A1* | 2/2002 | Usui ...................... | H04B 1/38 455/574 |

(Continued)

FOREIGN PATENT DOCUMENTS

AU    2013203922 A1    8/2013

OTHER PUBLICATIONS

International Search Report corresponding to PCT Application No. PCT/EP2016/060640, dated Aug. 9, 2016 (German and English language document) (5 pages).

*Primary Examiner* — Nabil H Syed
(74) *Attorney, Agent, or Firm* — Maginot, Moore & Beck LLP

(57) ABSTRACT

A method for operating a mobile device with a communication module and an accumulator, in particular a hand-held power tool, includes powering the communication module via electricity from the accumulator. The communication module enables wireless communication, and is powered only temporarily at least for transmitting data.

11 Claims, 1 Drawing Sheet

(56) References Cited

U.S. PATENT DOCUMENTS

| | | | |
|---|---|---|---|
| 2007/0058580 A1 | 3/2007 | Chae | |
| 2011/0207509 A1* | 8/2011 | Crawford | H04W 52/0245 455/574 |
| 2012/0154512 A1 | 6/2012 | Takao et al. | |
| 2012/0288279 A1* | 11/2012 | Zhang | H04B 10/272 398/66 |
| 2013/0120134 A1* | 5/2013 | Hicks, III | G08B 25/004 340/501 |
| 2013/0176869 A1* | 7/2013 | Finlow-Bates | H04W 52/0254 370/252 |
| 2014/0070924 A1 | 3/2014 | Wenger et al. | |
| 2014/0073486 A1* | 3/2014 | Ahmed | A61B 5/02405 482/9 |
| 2014/0184397 A1 | 7/2014 | Volpert | |
| 2015/0277428 A1* | 10/2015 | Dackefjord | G07C 3/04 700/180 |

\* cited by examiner

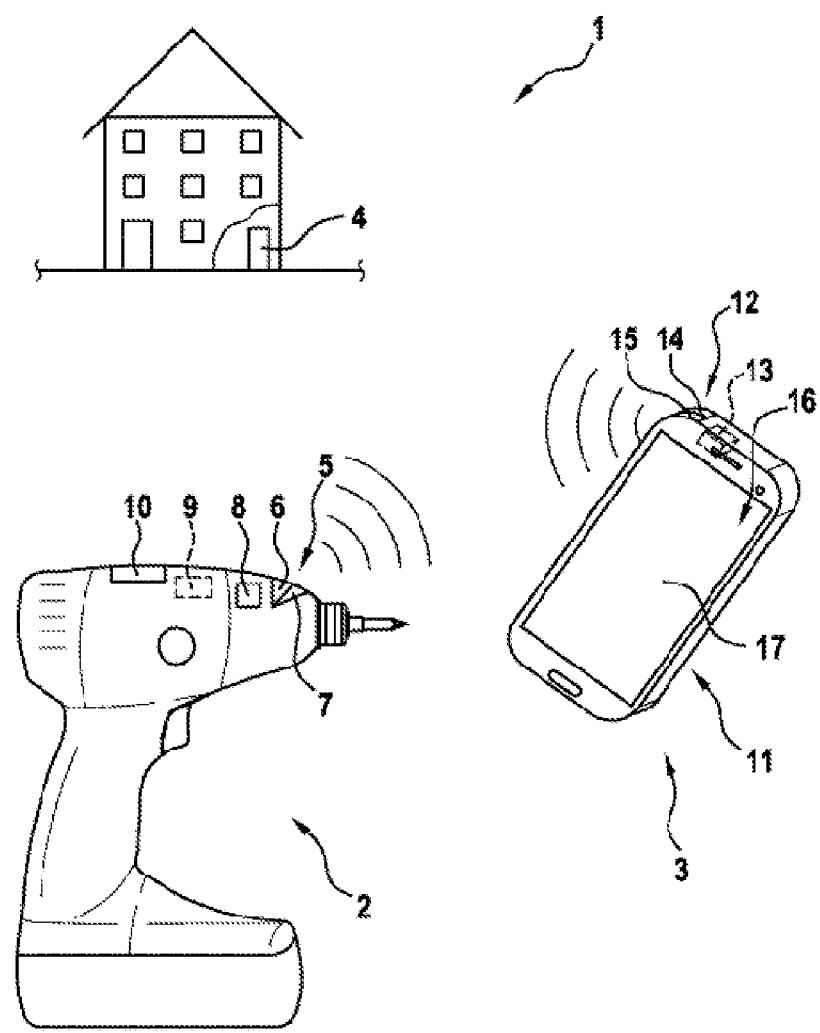

METHOD FOR OPERATING A MOBILE DEVICE AND A DATA MANAGEMENT SYSTEM, MOBILE DEVICE, DATA MANAGEMENT SYSTEM

This application is a 35 U.S.C. § 371 National Stage Application of PCT/EP2016/060640, filed on May 12, 2016, which claims the benefit of priority to Serial No. DE 10 2015 211 673.5, filed on Jun. 24, 2015 in Germany, the disclosures of which are incorporated herein by reference in their entirety.

The disclosure relates to a method for operating a mobile device, in particular a handheld machine tool or user identification unit, that has a communication module for wireless communication, wherein the communication module is supplied with electric power from an energy store of the mobile device.

Further, the disclosure relates to a method for operating a data management system that has at least one first mobile device, in particular a handheld machine tool, and at least one second mobile device, in particular a user identification unit, and a central unit, wherein the mobile devices communicate with one another and/or with the central unit wirelessly in each case.

In addition, the disclosure relates to a corresponding mobile device and to a data management system.

BACKGROUND

Methods, mobile devices and data management systems of the type cited at the outset are fundamentally known. Communication modules for wireless communication, that is to say for sending and/or receiving data, for example information data, control data, authorization data, identification data or the like, are fundamentally known. The operation of such communication modules requires electric power, which is usually provided by replaceable or rechargeable energy stores. Frequently, the energy stores are configured as primary cells, but sometimes also as secondary cells. In particular, it is known practice to configure such energy stores as buffer batteries. The running time of these energy stores is finite and, in particular, dependent on the operation of the communication module. After the running time has expired, the energy store needs to be charged or replaced. In a system in which a multiplicity of corresponding communication modules are used, for example in a data management system that comprises multiple mobile handheld machine tools and/or user identification units, maintaining and/or changing the energy stores represents a disadvantageous expenditure in terms of time and cost.

SUMMARY

The method according to the disclosure has the advantage that the frequency with which the energy store needs to be replaced or the energy store is charged is decreased and hence the acceptance of a mobile device or data management system of this kind is increased. In this regard, the method according to the disclosure provides for the communication module to be supplied with power only intermittently at least for sending data. The operation of the communication module is therefore limited in particular independently of an operating state of the mobile device, so that a persistent supply of current to the communication module is avoided. This reduces the stress on the energy store and the aforementioned advantages are obtained. In particular, there is provision for the supply of power to the communication module to be effected preferably only intermittently only for sending data, whereas the communication module is supplied with power persistently for receiving data. The effect achieved thereby is that the communication module can receive data, and therefore be addressed wirelessly, at any time. In this standby mode, only a small amount of power is needed. Alternatively, there is preferably provision for the communication module as a whole to be supplied with power only intermittently both for sending and for receiving data. Preferably, the communication module is supplied with power from an energy store that is independent of an energy store of the mobile device provided for operating the mobile device, for example for supplying electricity to an electrical drive machine of the mobile device. There is thus provision for the communication module to be supplied with power from a separate energy store independently of the remainder of the mobile device in accordance with the method according to the disclosure.

According to an advantageous development of the disclosure, there is preferably provision for the communication module to be supplied with power on the basis of user presets. As such, the user is provided with the option of setting the operating period of the communication module and/or times at which the communication module is meant to be supplied with power and disconnected from the power source, for example. To this end, the user is in particular provided with an input option by means of an input apparatus on the mobile device, operation of which allows the user to make the time presets.

As a particular preference, there is provision for the user to be able to deactivate the communication module, in particular independently of the operation of the mobile device, wherein the communication module is activated again and supplied with power after a predetermined period has elapsed after the deactivation. In this case, the user can put the communication module of the mobile device into a sleep mode or idle mode in which the communication module is no longer supplied with power. Only after the predetermined period has elapsed is the communication module automatically supplied with electric power from the energy store again and thereby activated.

In addition, there is preferably provision for the communication module to be supplied with power on the basis of a prescribeable transmission interval. In this case, the user is in particular provided with the option of predetermining transmission intervals, that is to say the distance in time between times at which the communication module is permitted to send or sends data. This allows the user to limit the power consumption of the communication module in a simple and comprehensible manner.

In addition, there is preferably provision for the communication module to be supplied with power only when a volume of data that exceeds prescribeable limit value is to be sent. This controls the operation of the communication module even on the basis of the volumes of data to be transmitted. Only when the volume of data is sufficiently large for it to be worth activating the communication module is the latter activated. This makes it possible to prevent the communication module from persistently transmitting small volumes of data and stressing the energy store for a corresponding length of time.

Further, there is preferably provision for the communication module to be supplied with power for sending data only if a request to send the data has been received by the communication module beforehand. This is important in particular if, as already mentioned above, the communication module is preferably supplied with power only intermittently for sending data, but is supplied with current persistently for receiving data. In this regard, a reception unit of the communication module is preferably supplied with current persistently, whereas a transmission unit of the communication module is activated or supplied with current only intermittently, as described above.

The method according to the disclosure is distinguished in that at least one of the mobile devices is operated by the method according to the disclosure. This reduces the consumption of the data management system as a whole and puts off the time at which energy stores are replaced or energy stores are recharged, without restricting the operation of the data management system. Further features and advantages can be found in the description above and in the claims.

The mobile device according to the disclosure is distinguished in that the controller for operating the communication module is configured specifically to perform the method according to the disclosure. This results in the advantages already cited. The controller may be a controller provided for the communication module separately or a controller of the respective module device.

The data management system according to the disclosure is distinguished in that at least one of the mobile devices corresponds to the mobile device according to the disclosure. In particular, there is provision for the second mobile device, which is configured in particular as a user identification unit, to be configured according to the disclosure.

BRIEF DESCRIPTION OF THE DRAWINGS

The disclosure will be explained in more detail below with reference to the drawing, in which the FIGURE shows a data management system in a simplified depiction.

The FIGURE shows a simplified depiction of a data management system 1 that has a first mobile device 2, a second mobile device 3 and a central unit 4. The central unit 4 is in particular a database server that is wirelessly contactable, for example via a wireless telephone network, by wireless LAN or by other radio standards. The database server 4 is used to register mobile devices that have been purchased, for example. In this case, it is moreover possible for data associated with the respective mobile device that relate to the mobile device itself or else to the user or purchaser of the mobile device to be stored as well.

According to the present exemplary embodiment, the mobile device 2 is configured as an electrically operated handheld machine tool that has a drive motor that is supplied with power by a replaceable storage battery pack 4. The mobile device 2 moreover has a communication module 5 that is configured to send or receive data wirelessly. In particular, the communication module 5 has a transmission device 6 and a reception device 7. Moreover, there is provision for the communication module 5 to have a separate power supply in the form of an energy store 8 that is configured as a buffer battery, for example. A controller 9 associated with the communication module 5 operates the communication module 5, the controller 9 moreover being connected to an input device 10 by means of which a user of the mobile device 2 can actuate the mobile device 2 and/or the communication module 5.

The mobile device 3 is configured as a mobile radio telephone and is used as a user identification unit 11 in the present case. The second mobile device 3 likewise has a communication module 12 having a separate energy store 13, the communication module 12 also comprising a transmission unit 14 and a reception unit 15. Moreover, the communication module 5 also has an associated controller 16 that is provided by the mobile phone itself in the present case, for example in the form of the microprocessor of the mobile radio telephone. The mobile device 3 moreover has a touch-sensitive screen 17 by means of which the user can manually input data into the mobile device 3 and operate the mobile device 3.

The two communication modules 5 and 12 are configured to communicate with one another or with the central unit 4 wirelessly and in particular to send and receive data.

By way of example, the data management system 1 serves to allow a user of the mobile device 2 to register using the mobile device 3 and if need be to download tool-specific data and to use said data to set the handheld machine tool. It is also possible for a user to use the mobile device 3 to retain an overview of possibly multiple handheld machine tools as per the mobile device 2 that are present by virtue of his registering them and collating them with data in the central unit 4. In order to be able to maintain the operation of the data management system 1 for as long as possible without having to replace or recharge the energy stores 8, 13 associated with the communication modules 5, 12, the communication modules 5, 12 are supplied with power by the respective energy store 8, 13 only intermittently at least for sending data.

The controller 9 and/or the mobile device 3 are configured such that the user can change a radio interval of the respective communication module 5 and/or 12. In particular, there is provision for the user to be able to firmly prescribe the radio interval, that is to say the distances in time after which the respective communication module 5, 12 is meant to be supplied with power. In the periods of time between the prescribeable periods of time or within the time interval, the supply of power for the respective communication module is interrupted or terminated, so that no electric power is consumed in this time. The user can switch the respective communication module 5, 12 wirelessly, for example via a software program, in particular in the case of the mobile device 3, or mechanically, for example by operating a switch or pushbutton switch, to an idle state in which the respective communication module 5 and/or 12 is deactivated and, in this respect, no longer supplied with power. Preferably, the respective mobile device 2, 3 or the respective communication module 5, 12 wakes up by itself after the prescribed period has elapsed, by virtue of its being supplied with current again. This is ensured by the respective controller 9 or 16. Moreover, it is advantageous that the respective communication module 5, 12 is activated again no later than when the respective mobile device 2 or 3 is started up, for example as a result of early operation of a main switch of the respective mobile device 2, 3 or the like. The user can therefore switch the respective communication module 5, 12 to a power-saving state that is canceled again automatically. The activation, in particular activation of the respective communication module 5, 12 for the first time, is preferably effected by a mechanical switch or pushbutton switch or as a result of the removal of an electrically isolating/insulating strip of material that, by way of example, is initially situated between two electrical touching contacts that are pretensioned against one another under spring loading.

Preferably, the cited solutions have provision for only the transmission unit 6 or 13 to be deactivated to save power, but for the reception unit to continue to be operated or to be supplied with electric power so as to activate the transmission unit again automatically when the communication module 5 or 12 receives an enquiry or demand by radio. As such, by way of example, there may be provision for the user identification unit 11 to transmit data to the central unit 4 only if a corresponding request from the central unit 4 is received for the communication module 12 of the mobile device 3. This may be the case if the central unit 4 requests a present location of the mobile device 3 or of the mobile device 2, for example.

Moreover, there is preferably provision for the respective communication module 5, 12 or the respective transmission unit to be activated if a volume of data that exceeds a prescribeable limit value is meant to be transmitted to the data memory unit of the central unit 4. By way of example, this is the case when larger changes in the data arise, for example when new mobile devices 2 having a corresponding communication module 5 enter the data system 1 or drop out therefrom, or when data of the user identification unit 11 are changed, for example in the event of changes in positioning data of the mobile device 2, at least if the latter has a satellite-based navigation module.

Further, there is advantageously provision for the respective communication module 5, 12 to be activated in order to monitor the surroundings for further communication modules 5, 12 only if a corresponding request from, by way of example, the central unit 4 or one of the mobile devices 2, 3 is received, or if data are changed, in particular as described above. The sensitivity for activation of the respective communication module 5, 12 on the basis of the change of data can be set by the user, preferably using the respective mobile device 2, 3. As such, the user is able, by way of example, to stipulate a radius, based on position data captured by a navigation system, within which the mobile device 2, 3 is meant or able to communicate with other mobile devices 2, 3 or with communication modules 5, 12 of other mobile devices 2, 3.

The invention claimed is:

1. A method of operating a mobile device comprising:
    alternatingly (i) activating a communication module of the mobile device and (ii) deactivating the communication module, the communication module having a wireless transmitter and a wireless receiver;
    operating the communication module to monitor a surroundings for other mobile devices, while the communication module is activated, in response receiving a request to monitor a surroundings for other mobile devices and in response to a user-defined amount of change in position data of the mobile device;
    operating the communication module to transmit data while the communication module is activated, wherein the communication module is activated if at least a predetermined volume of data is to be transmitted; and
    supplying electric power from an energy store of the mobile device to the communication module of the mobile device only while the communication module is activated.

2. The method as claimed in claim 1, wherein the communication module is activated and deactivated in accordance with user defined time intervals.

3. The method as claimed in claim 1, further comprising:
    deactivating the communication module in response to a second predetermined time interval elapsing after the most recent activation of the communication module; and
    activating the communication module in response to a first predetermined time interval elapsing after the most recent deactivation of the communication module.

4. The method as claimed in claim 1, wherein communication module is activated and deactivated in accordance with a prescribed transmission interval.

5. The method as claimed in claim 1, wherein the communication module is only activated in response to the communication module receiving a request to send the data.

6. A method of operating a data management system, comprising:
    wirelessly communicating between at least one of (i) a first mobile device and a second mobile device, and (ii) a central unit and at least one of the first mobile device and the second mobile device, wherein at least one of the first mobile device and the second mobile device includes:
        an energy store;
        a communication module having a wireless transmitter and a wireless receiver; and
        a controller configured to:
            alternatingly (i) activate the communication module and (ii) deactivate the communication module;
            operate the communication module to monitor a surroundings for other mobile devices, while the communication module is activated, in response receiving a request to monitor a surroundings for other mobile devices and in response to a user-defined amount of change in position data of the mobile device;
            operate the communication module to transmit data while the communication module is activated, wherein the communication module is activated if at least a predetermined volume of data is to be transmitted; and
            operate the energy store to supply electrical power from the energy store to the communication module only while the communication module is activate.

7. A data management system, comprising:
    a first mobile device including:
        an energy store;
        a communication module having a wireless transmitter and a wireless receiver; and
        a controller configured to:
            alternatingly (i) activate the communication module and (ii) deactivate the communication module;
            operate the communication module to monitor a surroundings for other mobile devices, while the communication module is activated, in response receiving a request to monitor a surroundings for other mobile devices and in response to a user-defined amount of change in position data of the mobile device;
            operate the communication module to transmit data while the communication module is activated, wherein the communication module is activated if at least a predetermined volume of data is to be transmitted; and
            operate the energy store to supply electrical power from the energy store to the communication module only while the communication module is activated.

8. The data management system as claimed in claim 7, further comprising:
    a second mobile device; and
    a central unit.

9. The method of claim 1, wherein the mobile device is a handheld power tool having a drive motor.

10. The method of claim 6, wherein the at least one first mobile device is a handheld power tool having a drive motor, and the at least one second mobile device is a mobile phone.

11. The data management system of claim 8, wherein the at least one first mobile device is a handheld power tool having a drive motor, and the at least one second mobile device is a mobile phone.

\* \* \* \* \*